United States Patent [19]

Baumgartner et al.

[11] Patent Number: 5,617,556
[45] Date of Patent: Apr. 1, 1997

[54] SYSTEM AND METHOD TO PREVENT THE OCCURRENCE OF A SNOOP PUSH DURING READ AND WRITE OPERATIONS

[75] Inventors: Yoanna Baumgartner; Dennis G. Gregoire; Amy M. Youngs, all of Austin, Tex.

[73] Assignee: International Business Machines Corporation, Armonk, N.Y.

[21] Appl. No.: 515,797

[22] Filed: Aug. 16, 1995

Related U.S. Application Data

[63] Continuation of Ser. No. 123,817, Sep. 20, 1993.

[51] Int. Cl.⁶ .............................. G06F 12/00; G06F 13/00
[52] U.S. Cl. ...................... 395/468; 364/DIG. 1; 364/DIG. 2; 364/243.4; 364/243.45; 364/964.342; 395/445
[58] Field of Search .................... 395/445, 468, 395/469, 470, 473, 481, 482; 364/DIG. 1, DIG. 2, 243.4, 243.45, 964.342

[56] References Cited

U.S. PATENT DOCUMENTS

| | | | |
|---|---|---|---|
| 4,084,234 | 4/1978 | Calle et al. | 395/425 |
| 4,747,043 | 5/1988 | Rodman | 395/425 |
| 4,992,930 | 2/1991 | Gilfeather et al. | 395/425 |
| 5,025,365 | 6/1991 | Mathure et al. | 395/425 |
| 5,072,369 | 12/1991 | Theus et al. | 395/425 |
| 5,091,846 | 2/1992 | Sachs et al. | 395/250 |
| 5,097,532 | 3/1992 | Borup et al. | 395/425 |
| 5,119,485 | 6/1992 | Ledbetter, Jr. et al. | 395/425 |
| 5,247,648 | 9/1993 | Watkins et al. | 395/470 |
| 5,265,235 | 11/1993 | Sindhu et al. | 395/473 |
| 5,317,720 | 5/1994 | Stamm et al. | 395/470 |
| 5,319,766 | 6/1994 | Thaller et al. | 395/473 |
| 5,341,487 | 8/1994 | Derwin et al. | 395/425 |
| 5,353,415 | 10/1994 | Wolford et al. | 395/425 |
| 5,404,483 | 4/1995 | Stamm et al. | 395/470 |

FOREIGN PATENT DOCUMENTS

| | | |
|---|---|---|
| 0309994 | 4/1989 | European Pat. Off. |
| 0559409A1 | 3/1993 | European Pat. Off. |

*Primary Examiner*—Tod R. Swann
*Assistant Examiner*—Tuan V. Thai
*Attorney, Agent, or Firm*—Mark E. McBurney

[57] ABSTRACT

A system and method are provided which include devices implementing a snooping protocol. Data to be written by an I/O peripheral to an I/O controller is mapped to a specific location in memory, and then the data is actually written to an L1 cache in the controller by the I/O device. During this period when the I/O device is writing to the controller cache, the controller does not actually own the data stored in the specific memory location. Once the write operation is complete for a given memory sector, the I/O controller then performs the bus operations required to obtain ownership of the data in the specified memory location. The data read from memory is then merged with the data written from the I/O device and written back to the memory. If a snoop hit is identified by the I/O controller, during the period when the data is owned the I/O controller intervenes to prevent the memory access which caused the snoop hit. The invention limits the time period in which a snoop hit can occur to only those times when the device owning the data is already in the process of performing an atomic Read-Modify-Write operation such that reordering of queued bus transaction operations is never required.

5 Claims, 4 Drawing Sheets

SYSTEM AND METHOD TO PREVENT THE OCCURRENCE OF A SNOOP PUSH DURING READ AND WRITE OPERATIONS

This is a continuation of application Ser. No. 08/123,817 filed Sep. 20, 1993.

BACKGROUND OF THE INVENTION

1. Field of the Invention

The present invention relates to a data processing system having multiple data cache devices which monitor a system bus to maintain cache coherency. More particularly, the invention is a method of controlling a data transfer operation such that the need to reorder bus transactions in response to a request for data by another device monitoring the bus is eliminated.

2. Background of the Invention

Conventional systems are known which implement what is commonly referred to as "snooping" in order to monitor a system bus for the memory address of the data that the device is modifying. Generally, when more than one device, which includes a cache, is capable of modifying data stored at a particular memory address the devices perform bus snooping to determine whether another device has requested the same data which is owned (the device has been granted access to the data) by the device doing the modifying. The requesting device places the memory address for the desired data on the system bus and the device which owns the data monitors the bus for this address. The device owning the data compares the memory address on the bus with the memory address of the data being modified, and if the addresses are the same a "snoop hit" is said to have occurred. The conventional response to a snoop hit is to perform a "snoop push" operation which causes the modifying device to immediately push, or transfer, the data back to memory. This snoop push requires all pending bus transaction operations to be reordered such that the transactions that implement the snoop push are executed first. A great deal of complex logic is required to perform this reordering of bus transactions.

For example, a modifying device (such as a central processing unit), or the like performs a read with intent to modify operation which reads the data from the system memory and stores a copy of the data in its cache. Next, the modifying device begins snooping the bus and also begins modifying the data. If the device sees the memory address of the data that it currently owns then a snoop hit occurs. Snoop hits are normally caused by another device requesting the data from memory by placing the memory address of the requested data on the system bus.

Generally, when a snoop hit occurs the device which has modified the data must reorder its bus transaction queue and transfer the modified data back to system memory in order for the requesting device to have the most up to date copy of the data, this is accomplished using a snoop push. Additionally, the requesting device must be prevented from reading the existing, or unmodified, copy of the data currently stored in memory. Often, the CPU, or other device that has modified the data is performing other operations as well. In order to perform these operations, the processor will have a sequence of bus transactions to be executed queued up. When a snoop hit occurs, these conventional processing systems must make transferring the modified data in its cache to the system memory (the snoop push) the number one priority. This forces the processor to have a mechanism that will reorder all of the bus transactions which are already in its queue such that those transactions required to implement the snoop push are executed first. A great deal of complex logic is needed in order to implement a snoop push operation.

Therefore, it can be readily understood how a system which utilizes specific control signals to avoid the necessity of ever performing a snoop push operation would be advantageous since the result would be a system having greatly reduced complexity and, therefore, less physical hardware components, less hardware development time and cost.

U.S. Pat. No. 5,025,365 describes a cache coherency protocol wherein a "Purge Command" is used to cause the data to be returned to memory and the device modifying the data to mark its copy as invalid. U.S. Pat. No. 5,072,369 is an interface for providing cache coherency between buses. A bus interface circuit places a signal on one of the buses telling the bus master to copy data from the cache into main memory before the interface circuit performs a main memory access. European patent application 0 309 994 describes a computer having a specific function which clears, or flushes, the contents of a cache, based on the state of a specific control signal, in order to maintain cache coherency. U.S. Pat. No. 5,097,532 also uses a flush signal to enable and disable a cache by clearing all the valid bits to insure coherency.

Additionally, the PowerPC 601 Reduced Instruction Set Computing (RISC) microprocessor (POWERPC is a trademark of IBM Corp.) uses a snoop push operation which copies back modified sectors of a cache which are hit by snooping operations. When a snoop hit occurs, this processor issues a signal which causes the system to reorder its data bus operations to push the data from its cache into system memory. For additional information regarding the POWERPC 601 microprocessor see the POWERPC 601 Microprocessor User's Guide, published by Motorola Corporation.

It can be seen that none of the conventional systems provide a protocol that will allow a processing system to avoid implementing a snoop push in response to a snoop hit.

SUMMARY OF THE INVENTION

In contrast to the prior art, the present invention provides a system which avoids the necessity of responding to a snoop hit with a flush, or snoop push operation.

Broadly, a system is provided which includes a central processing unit, memory system and input/output controller wherein both the I/O controller and CPU include a level 1 (L1) cache. A number of I/O peripheral devices are connected to the I/O controller and are capable of writing to the L1 cache contained thereon. The data to be written by an I/O peripheral is mapped to a specific location in memory, and then the data is actually written to the controller L1 cache by the I/O device. During this period when the I/O device is writing to the controller cache, the controller does not actually own the data stored in the specific memory location. Once the write operation is complete for a given memory sector, the I/O controller then performs the bus operations required to obtain ownership of the data in the specified memory location. The data read from memory is then merged with the data written from the I/O device and written back to the memory. Once the I/O controller owns the data in the memory sector, "snooping" operations are commenced on the bus to determine if there are other devices, such as the CPU, which require the data in the controller cache. If a snoop hit is identified by the I/O controller, the normal response would be to intervene to prevent the requested memory access, and then reorder any queued bus transaction operations so as to immediately perform a snoop push to provide the data to memory. However, in accordance with the present invention, the I/O controller only intervenes to prevent the memory access. The essence of the invention is that the time period or "window" in which a snoop hit can occur is limited to only those times when the device owning the data is already in the process of performing an atomic Read-Modify-Write operation such that reordering of queued bus transaction operations is never required.

The present invention takes advantage of the fact that the I/O controller is already in the process of merging the data from the I/O with the data from system memory and writing the updated copy back to memory. This write back operation was scheduled independently of the snoop hit. Therefore, it is necessary only to hold off the requesting device for the short period of time until the merged data is written back to system memory. The necessity of including complex reorder logic on the I/O controller, or other snooping device, is eliminated, thereby making the controller more efficient and less costly.

Therefore, in accordance with the previous summary, other objects, features and advantages of the present invention will become apparent to one skilled in the art from the subsequent description and the appended claims taken in conjunction the accompanying drawings.

DETAILED DESCRIPTION OF THE PREFERRED EMBODIMENTS

Figure 1:
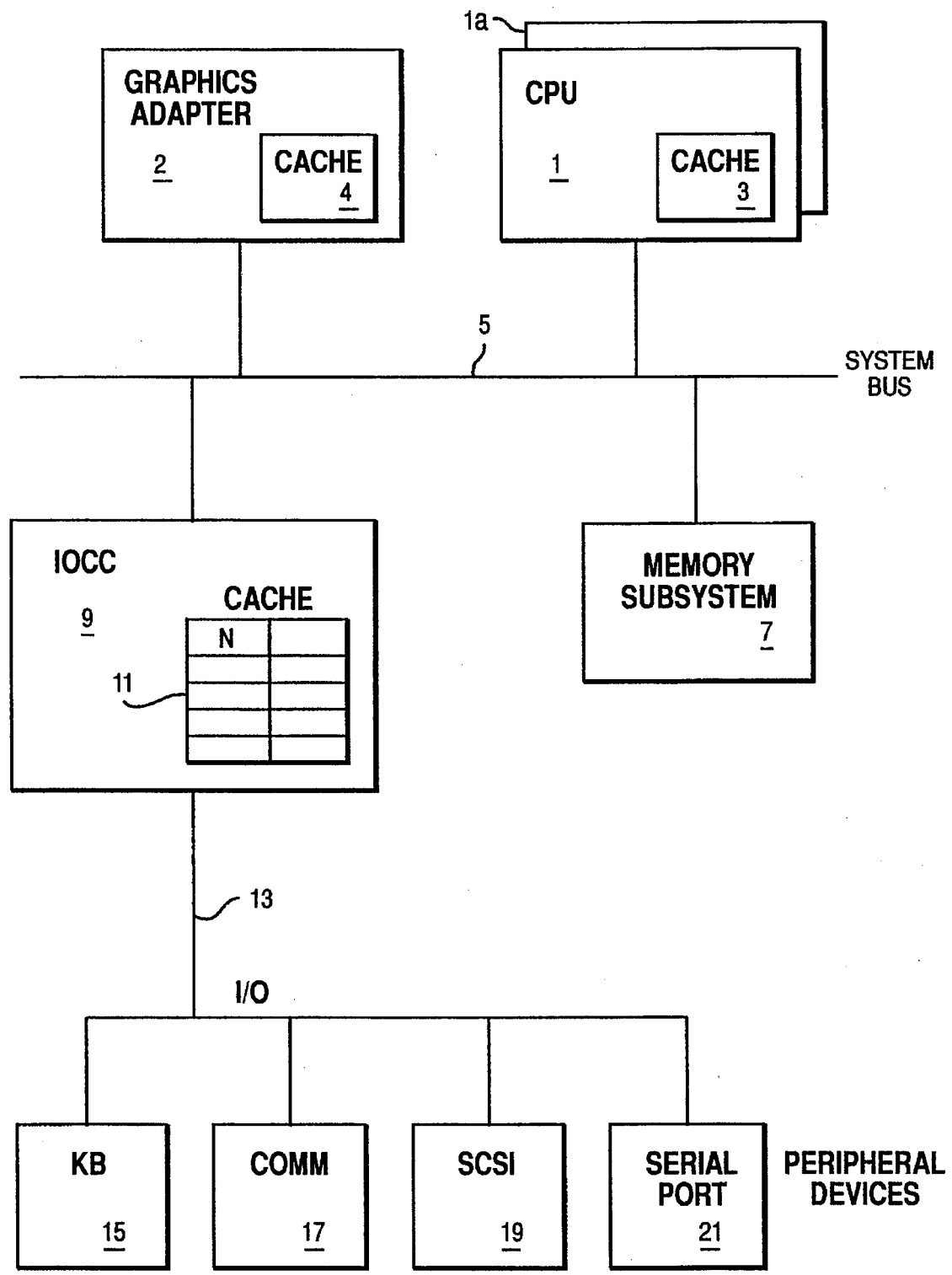
FIG. 1 is a block diagram showing the components of a system capable of implementing the present invention.

Referring to FIG. 1, a block diagram of a data processing system implementing the present invention is shown. Central processing unit (CPU) 1 is shown having a level 1 (L1) cache 3 and attached to system bus 5. CPU 1 may be any one of a number commercially available processing units, but in a preferred embodiment is the PowerPC 601 Microprocessor designed by IBM Corporation (PowerPC is a trademark of IBM Corp.) Additionally, the present invention contemplates a multiprocessor system wherein plural CPUs are connected to system bus 5, as shown by reference 1A. Input/output control chip (IOCC) 9 is also shown attached to system bus 5 and includes an L1 cache 11 having a plurality of memory sectors N. Input/output bus 13 is shown which interconnects peripheral devices 15, 17, 19, 21 to IOCC 9. These peripheral devices include keyboard, mouse, small computer system interface (SCSI), serial port, parallel port, communications, and the like. IOCC 9 allows those peripheral devices to be attached to and communicate with CPU 1 via system bus 5. Also, various other devices can be attached to bus 5, including a graphics adapter 2 with L1 cache 4, or the like. Memory subsystem 7 is also shown attached to system bus 5 and includes a memory control unit and corresponding memory devices, such as static random access memory (SRAM) chips, or the like. It should be noted that the present invention will be described with regard to IOCC 9, however it should be understood that the scope of the present invention will apply to any L1 cache device with snooping protocol, such as a central processing unit.

Peripheral bus master devices 15, 17, 19, 21 will read data from memory 7 and correspondingly write data thereto. Of course, the bus master devices must arbitrate for ownership of I/O bus 13 prior to being able to communicate with IOCC 9. During read operations, a bus master peripheral device issues a direct memory access (DMA) read request. The IOCC 9 then must arbitrate for and obtain ownership of the data required by the DMA master device at the particular memory address of a 32 byte sector in memory 7 where the desired data is located. IOCC 9 uses a read with intent to modify (RWITM) operation to obtain ownership of the data to be read by the DMA slave device. The data is then loaded into the IOCC cache 11 and the I/O read cycle is allowed to proceed with the next required 32 byte sector of memory being fetched from memory. During the read operation, IOCC 9 will protect its ownership of the data requested by the DMA bus master by utilizing an address retry (ARTRY) for any snoop hit which occurs on the data owned by the IOCC 9 which is in cache 11. The ARTRY signal prevents other participants from getting a copy of the data and since the operation is a read, the same data exists in memory 7 which is owned by cache 11 such that a snoop push is not required. That is, during a read operation by a DMA bus master, it is not necessary to push the data in cache 11 back into memory 7 since the data is an identical copy and any other device requiring the data can read it from memory 7 as soon as IOCC 7 releases bus 5 by deactivating the ARTRY signal. Additionally, subsequent to the read operation, IOCC 9 invalidates its own copy of the data since the requesting device, which caused the snoop hit, will modify the data such that the bus master peripheral device will wait for the new version of data to be available and then reinitate a read operation.

However, write operations by one of DMA bus master peripheral devices 15, 17, 19, 21 is a more complex situation, because the bus master device writing data to cache 11 of IOCC 9 that will modify data in memory 7. Thus, when other devices such as CPU 1, graphics adapter 2, or the like, request the memory address for the data the DMA bus master is writing to, the copy modified by the bus master device needs to be made available to the requesting device. Normally, when another device requests access to the data in cache 11 (snoop hit), a corresponding snoop push operation would occur wherein IOCC 9 would suspend all other bus transaction operations and reorder the transactions in its queue to immediately transfer the modified copy of the data in cache 11 to memory subsystem 7. The present invention eliminates the need for complex logic to reorder bus transactions to implement a snoop push operation.

Initially, the present invention maps the I/O bus master device request for a write to a specific memory address, before allowing the bus master to write any data to cache 11.

Once the memory address of the 32 byte data sector requested by the I/O bus master has been mapped to a specific location in memory, IOCC 9 treats the data as being in a "dirty" (DRT) state. In the dirty state, the data received from the DMA bus master is not yet considered a valid copy of system memory data and the IOCC 9 will detect snoop hits to data in cache 11 which is the dirty state. More particularly, IOCC 9 is not considered to own the data at the specific memory address during the dirty state.

Therefore, the DMA bus master device can write to cache 11 while the data is in the dirty state and no snoop hit will occur for this data, since it is not owned by IOCC 9. When the bus master has completed writing to the mapped 32 byte sector of memory, IOCC 9 then must arbitrate for system bus 5 and obtain actual ownership of the data. If the bus master device has completely filled a 32 byte sector of memory with new data, then IOCC 9 will implement a write operation wherein the sector of memory corresponding to the new data written by the bus master is completely overwritten. However, if the bus master has only filled a portion of the 32 byte sector with new data, then a read with intent to modify (RWITM) operation is used. This RWITM will allow IOCC 9 to obtain ownership of the data and read the existing copy from memory into cache 11. The data in this 32 byte sector will then be modified with the data written by the bus master device. Then, IOCC 9 will use a write operation to place the updated data (merged with the data written by the DMA bus master) in memory 7. During the period when IOCC 9 reads and modifies the data, the IOCC responds to a snoop hit only by issuance of an ARTRY_signal which holds off the device which has requested the data.

Figure 2:
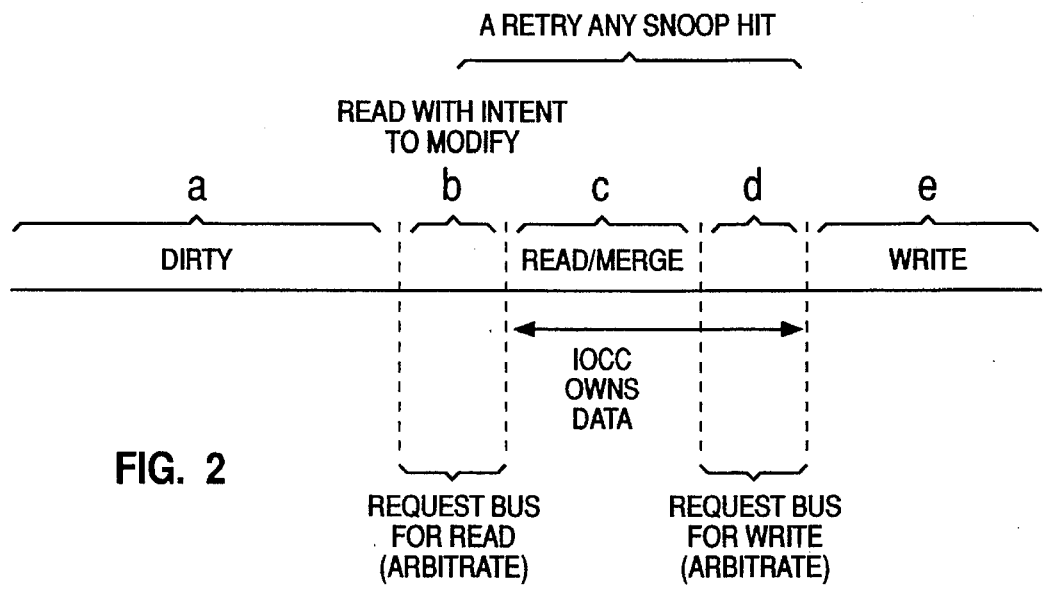
FIG. 2 is a timing diagram illustrating sequence of events during the time period when the snoop push operation is avoided in accordance with the present invention.

FIG. 2 is a diagram showing the timing of the control signals used by IOCC 9 to avoid a snoop push operation. During period A, when the data is in the dirty state, IOCC 9 does not snoop system bus 5, since IOCC 9 does not yet own the data and a snoop hit cannot occur. I/O bus master, e.g. one of devices 15, 17, 19, 21 is allowed to write to cache 11, but since the data is not owned by IOCC 9, it is not considered a valid copy of the data. Thus during period A, if another device requests this dirty data, the requesting device will obtain the copy from memory 7, since it is the one considered to be valid.

Once the I/O bus master has completed writing data to cache 11, or if all of the memory sectors originally mapped by IOCC 9 are filled, then the next step is to replace the copy of the data stored in memory subsystem 7 with the data written by the I/O bus master to cache 11. It should be understood that if the DMA bus master fills an entire mapped 32 byte sector of memory then that location in memory is overwritten with the new data. However, if only a portion of the 32 byte sector has been written to by the bus master, then the existing copy from memory must be merged with the newly written data from the bus master in order to create a new copy.

After the DMA bus master has completed writing a sector, the memory must be updated. IOCC 9 requests bus 5 using an arbitration scheme at point B of FIG. 2. Once the bus is awarded the IOCC 9, a read with intent to modify (RWITM) signal is used to obtain exclusive ownership of the data having the same memory address of the data written to cache 11 by the I/O bus master device. It should be noted that a read with intent to modify signal is used when the bus master has written some but not all the bytes in the 32 byte sector of memory. In this case, the entire sector from the memory must be fetched and merged with that portion of the data in cache 11 which has been written by the I/O bus master to create an updated copy of the data. In the event, that the bus master has filled an entire 32 byte sector with new data a write signal is utilized which overwrites the existing sector of memory subsystem 7 with the new data such that a merge of existing and new data is not required. However, in the case where not all of the bytes in the 32 byte sector, e.g. sector N of FIG. 1, are written by the bus master, the read with intent to modify signal must be used to merge the data. Returning to FIG. 2, it can be seen that subsequent to period C (arbitration) and during period C, IOCC 9 owns the data and will respond to any snoop hit only by issuing an ARTRY signal. Once the merge operation is complete the IOCC 9 requests bus 5 (during period D) by arbitration and once the bus is awarded, IOCC 9 will write the new merged data to memory subsystem 7 during the write period E of FIG. 2. Therefore, it can be seen that IOCC 9 of the present invention avoids a snoop push operation by issuing an ARTRY signal which effectively holds off the memory access which caused the the snoop hit, while the IOCC 9 completes the process of merging and writing the data back to memory subsystem 7. That is, since the data is in the process of being written back to memory 7, IOCC 9 avoids the need to respond to a snoop hit by reordering its bus transactions. Therefore, the complex logic required to implement this reordering is not required by IOCC 9 (or any other devices which may update an L1 cache and write the contents back to system memory).

As noted above, in the event that the I/O bus master fills all 32 bytes of a memory sector, IOCC 9 would go immediately from the dirty state at period A to period D where ownership for the system bus is arbitrated. During period E, the write operation is implemented, thereby overwriting the existing data in memory subsystem 7. It should be noted that a snoop push would not occur during the period when data is being written back to memory (period E of FIG. 2), since the purpose of the snoop push is to place the most recent copy of the requested data in memory and that is already being accomplished with the write operation.

Figure 3A:
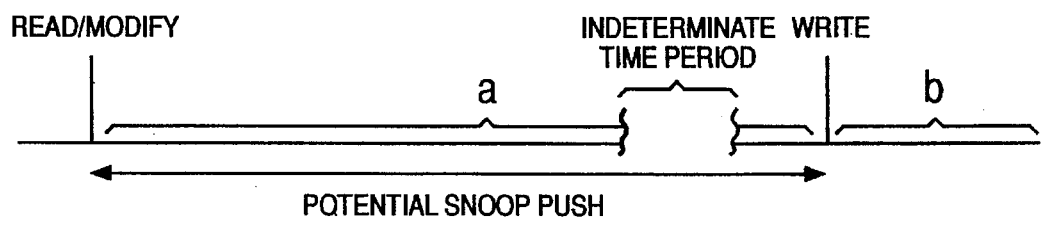
FIG. 3 is two timing diagrams showing the period when a snoop push may occur in a prior art system during a read modify write operation, compared with the same period wherein a snoop push is avoided by the present invention for the same operation.
Figure 3B:
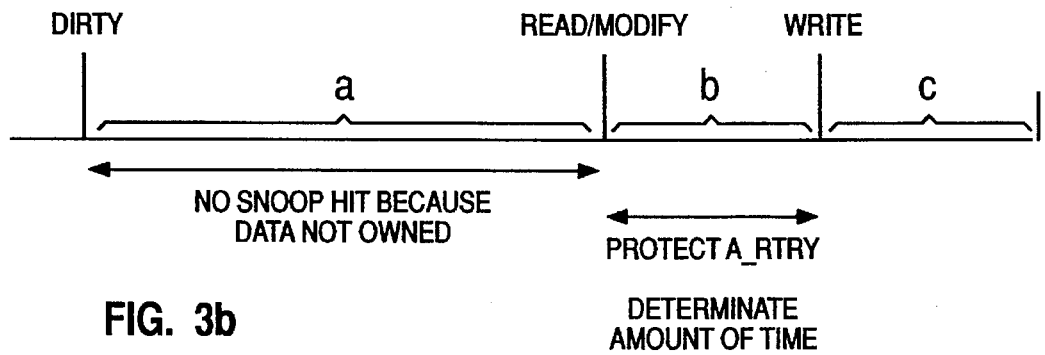

FIGS. 3a and 3b are simplified versions of the diagram of FIG. 2 showing the contrast between a conventional system which must account for a snoop push operation by reordering pending bus transactions, and the present invention which avoids all snoop push operations. FIG. 3a is a system which does not include a dirty state wherein data can be written to a cache without the cache having ownership of that data. Thus, during time period A, wherein a read with intent to modify signal has been issued, the potential for a snoop push operation is present. That is, if a snoop hit did occur during period A, a conventional system must cease all other bus transaction operations and reorder these transactions such that the modified data is immediately pushed backed to memory 7. It should be noted that the period of time that is required for the read/modify is indeterminate, because snoop hit could be received at any point, which would cause a snoop push, and interrupt the read/modify operation. As noted above, during the write period B in a conventional system, a snoop hit will not occur since the purpose of snooping is to cause data to be written back to the memory and the memory write back is currently in process.

In contrast, in FIG. 3b illustrates how a snoop hit will not occur during period A because the data is considered to be in a dirty state wherein it is not owned by IOCC 9 such that no snooping operations will be conducted. Once exclusive ownership of the data is obtained during period B when the data is being read back from memory and merged with the data written by a DMA bus master, IOCC 9 maintains cache coherency by issuing the address retry signal in response to a snoop hit, thereby forcing the device requesting the data to wait until the modified data is merged with the original copy of data from memory subsystem 7. In contrast to the system operating in accordance with FIG. 3a, the present invention provides a determinate amount of time during period B when the read and modify operations are being conducted. Even though the system may have to issue an ARTRY signal during this period, there is no need reorder bus operations in order to performa a snoop push operation. During period C, the modified data is written back to memory subsystem 7 and becomes the new valid copy. Again, during the write back period a snoop hit will not occur since the data is already being provided to the memory subsystem 7.

Figure 4A:
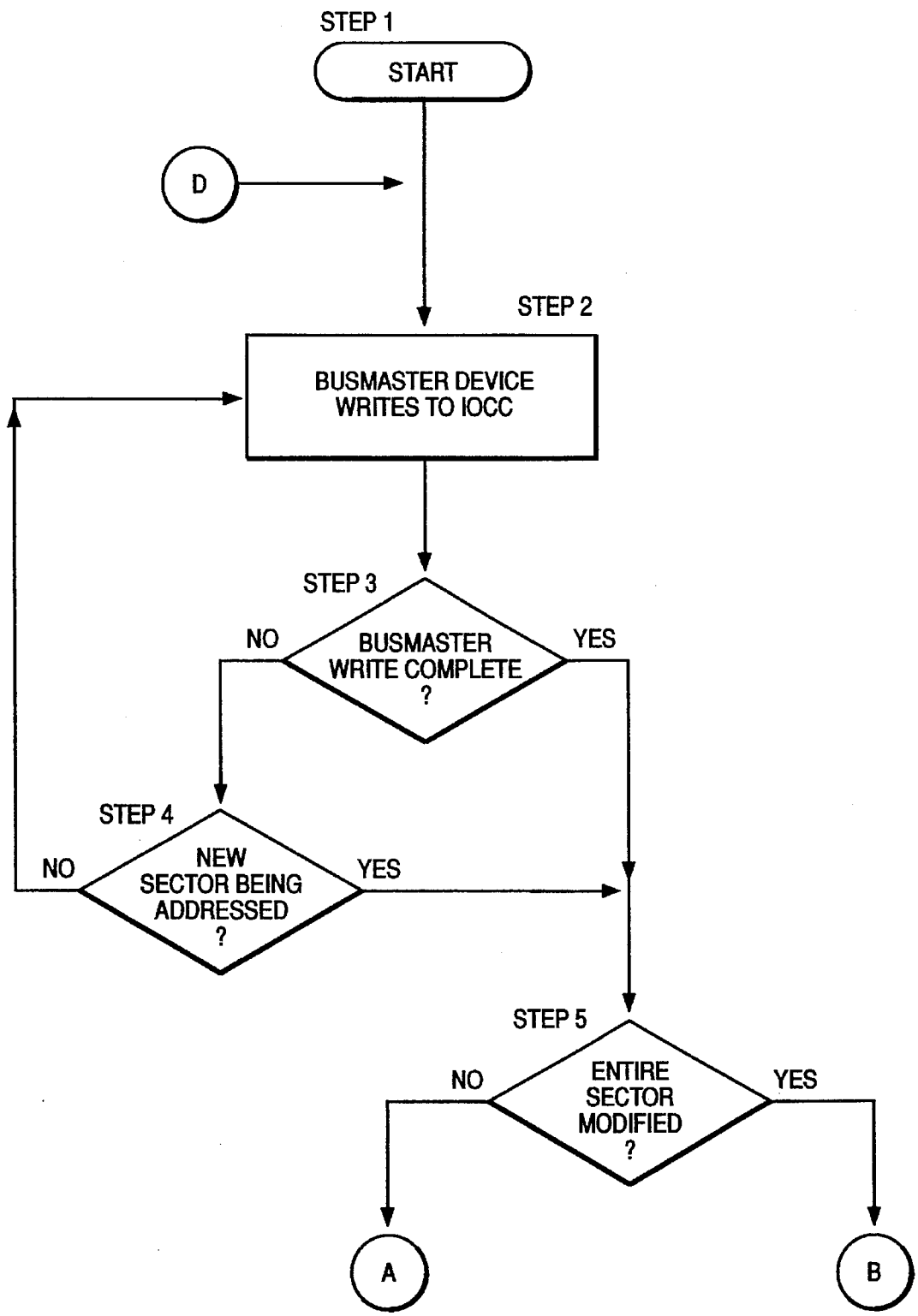
FIG. 4 is a flow chart showing the sequence of operations performed by the controller of the present invention to avoid a snoop push operations.
Figure 4B:
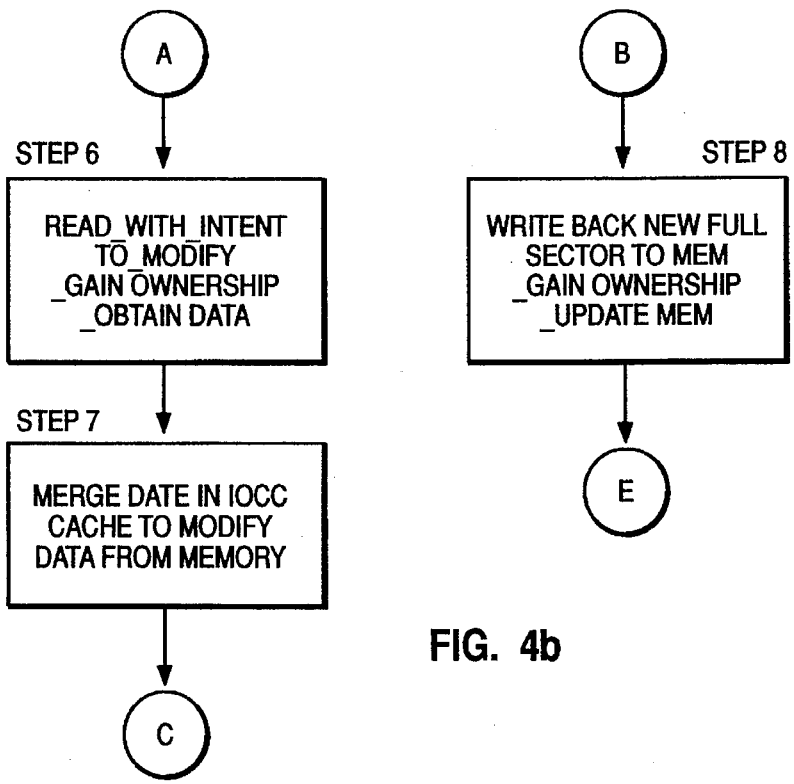
Figure 4C:
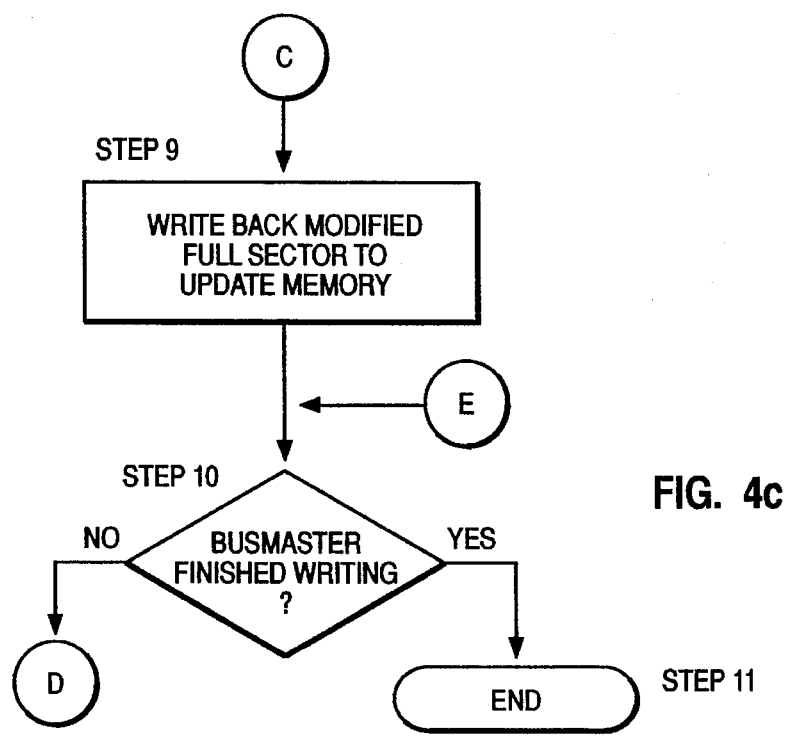

FIGS. 4a through 4c are flowcharts representing the sequence of operations the present invention must perform. Those skilled in the art will readily understand how the steps illustrated in FIGS. 4a–4c can be implemented in logic circuitry and included on IOCC 9, or another cache device which implements snooping protocol.

At step 1, the process is started and the bus master device, e.g. devices 15, 17, 19, or 21, begins writing to cache 11 of the IOCC 9. Step 3 then determines if the bus master has completed writing the data. If so, step checks to see whether the memory sector being written to by the bus master device is full, and if not, i.e. the bus master has not complete writing and the memory sector is not full, then the process loops back to step 2 and the bus master continues writing. However, if either the bus master has completed writing to the cache 11 of IOCC 9 (step 3), or has addressed a new sector (step 4), then the process of the present invention continues to step 5. It is then determined if the entire memory sector has been modified, i.e. has the memory sector has been completely filled with new data from the bus master. If step 5 determines that the entire memory sector has been replaced, then the process jumps to step 8 wherein IOCC 9 must arbitrate for system bus 5, gain ownership of the data and write the data in the memory sector back to memory 7, thereby overwriting all of the existing data in memory. It can be seen that when the entire memory sector is written with data from the bus master, no merger is necessary.

If at step 5 it is determined that the bus master device did not entirely fill the memory sector to which it is writing, the process continues to step 6 wherein IOCC 9 uses a read with intent to modify signal to gain ownership of the data and read the data from memory 7 to cache 11. At step 7, the data written by the bus master and the data read from memory are merged in order to created an update copy of the data. During the operations shown by steps 6 and 7, the present invention will issue an ARTRY signal in response to any snoop hits to hold off the device requesting the data being updated. Next, the updated copy of the data, which was merged at step 7 is written back to memory at step 9. Subsequent to both of the write back steps 8 and 9, the process determines at step 10 is the bus master is finished writing data to cache 11. If not, the process loops back to step 2 and continues, as previously described. If the bus master has completed writing data, then the method of the present invention ends at step 11.

Thus, by uniquely controlling a data transfer operation to a L1 cache in snooping device, the present invention allows complex bus transaction reordering logic used by conventional systems to be eliminated. This complex logic places bus transactions used to implement a snoop push operation in the front of the queue. That is the device, such as IOCC 9, CPU 1, or the like, must stop current bus transaction activity and place the snoop push transaction in a position such that it would be executed immediately. Thus, it can be seen how implementation of the present invention will save considerable overhead associated with designing and implementing data transfer operations. Further, the present invention will increase performance, since the time period during which the data is read back from memory and modified is a relatively short determinate period of time, rather than an indeterminate period of time, as shown in the comparison diagrams of FIGS. 3a and 3b.

Although certain preferred embodiments have been shown and described those skilled in the art will understand that many changes and modifications can be made therein without departing from the scope of the appended claims.

We claim:

1. A method of controlling a cache to provide memory coherency, comprising the steps of:

mapping modification data to be written to said cache to a specific location in a system memory;

writing said modification data only to said cache prior to said cache obtaining ownership of original data residing in said system memory at said specific location;

mapping said modification data in said cache to an address corresponding to a memory sector address containing said copy of said original data reading a copy of said original data at said specific location from said system memory; includes arbitrating for ownership of a system bus such that said copy of said original data is read from said system memory; and gaining ownership of said original data, creating merged data by merging said modification data with said copy of said original data from said specific location in said system memory;

initiating an operation to write said merged data to said specific location in said system memory;

detecting a snoop hit, by a snooping processor, during either said step of creating or said step of initiating; and preventing a snoop push operation from occurring upon detection of said snoop hit by issuing a retry signal to said snooping processor;

wherein said step of initiating is implemented independent of said snoop hit.

2. A method according to claim 1 wherein said step of creating comprises the step of:

determining whether said modification data partially fills said memory sector;

combining said modification data partially filling said memory sector, and a portion of said original data, which is contained in a remainder of said memory sector.

3. A method according to claim 2 wherein said step of initiating comprises the step of arbitrating for ownership of said system bus such that said merged data is written to said system memory at said memory sector address.

4. A system for controlling a cache to provide memory coherency, comprising:

means for mapping modification data to be written to said cache to a specific location in a system memory;

means for writing said modification data only to said cache prior to said cache obtaining ownership of data residing in said system memory at a specific location;

and further comprises:

an input/output device writing data to the cache of said at least one control device; and first circuit means within said at least one control device for issuing a write control signal, second circuit means within said at least one control device for issuing address retry control signal to prevent said snoop push operation upon an occurrence of a snoop hit, means for reading a copy of said data at said specific location from said system memory, and further comprises first circuit means within said at least one control device for issuing a read with intent to modify bus control signal;

means for creating merged data by merging said modification data with said copy of said data from said specific location in said system memory;

means for initiating an operation to write said merged data to said specific location in said system memory;

means for detecting a snoop hit, by a snooping processor, while said merged data is being created or said operation to write is being initiated; and means for preventing a snoop push operation from occurring upon detection of said snoop hit, by issuing a retry signal to said snooping processor;

wherein said means for initiating implements said operation to write independent of said snoop hit wherein said means for reading, and said means for initiating further comprise a second circuit means for arbitrating for ownership of said system bus.

5. A system according to claim 4 wherein said system for controlling, further comprises:

a central processing unit;

at least one control device including said cache;

a system bus connecting said central processing unit, said system memory and said at least one control device.

* * * * *